United States Patent [19]

Azaml et al.

[11] Patent Number: 5,169,162
[45] Date of Patent: Dec. 8, 1992

[54] PISTON RING HAVING A FUNCTION WHICH IS FOR FACILITATING SUPPLY OF LUBRICATING OIL INTO AN ANNULAR GROOVE OF A PISTON

[75] Inventors: Katsumasa Azaml, Isesaki; Takeo Takahashi, Tamamura, both of Japan

[73] Assignee: Sanden Corporation, Gunma, Japan

[21] Appl. No.: 877,384

[22] Filed: Apr. 29, 1992

Related U.S. Application Data

[63] Continuation of Ser. No. 444,400, Dec. 1, 1989, abandoned.

[30] Foreign Application Priority Data

Dec. 3, 1988 [JP] Japan ............................ 63-303990
Apr. 13, 1989 [JP] Japan ............................... 1-60480

[51] Int. Cl.⁵ .................................................. F16J 9/00
[52] U.S. Cl. ................................... 277/215; 277/79; 277/202; 277/201; 92/158; 29/888.07
[58] Field of Search ............... 277/215, 216, 201, 202, 277/206 R, 70, 79, 173, 192; 29/888.07, 888.073; 92/158, 159

[56] References Cited

U.S. PATENT DOCUMENTS

| | | | |
|---|---|---|---|
| 307,334 | 10/1884 | Richards | 277/215 |
| 1,369,592 | 2/1921 | White | 277/215 |
| 1,565,299 | 12/1925 | Wenzel | 277/215 |
| 1,581,312 | 4/1926 | Fryoux, Jr. et al. | 277/215 |
| 1,760,122 | 5/1930 | Drevitson | 92/158 |
| 1,803,309 | 4/1931 | Budlong . | |
| 1,815,354 | 7/1931 | Grant . | |
| 2,096,003 | 10/1937 | Morton et al. | 277/79 |
| 2,112,103 | 3/1938 | Kottusch | 277/215 |
| 2,262,311 | 11/1941 | Zahodiakin | 277/192 |
| 2,372,979 | 4/1945 | Phillips . | |
| 2,652,298 | 9/1953 | Estey | 277/173 |
| 3,214,182 | 10/1965 | Herbruggen | 277/201 |
| 3,359,872 | 12/1967 | Foster . | |
| 3,396,976 | 8/1968 | Reinhoudt et al. | 277/216 |
| 3,698,054 | 10/1972 | Prasse | 29/156.63 |
| 3,831,952 | 8/1974 | Geffroy | 277/171 |
| 3,851,889 | 12/1974 | Nisper | 277/214 |
| 3,920,254 | 11/1975 | Johnston et al. | 277/215 X |
| 4,594,055 | 6/1986 | Hatakeyama et al. | 417/269 |
| 4,681,326 | 7/1987 | Kubo | 277/215 X |
| 4,697,992 | 10/1987 | Hatakeyama et al. | 417/269 |
| 4,835,856 | 6/1989 | Azami | 29/888.073 |

FOREIGN PATENT DOCUMENTS

| | | | |
|---|---|---|---|
| 0613959 | 2/1961 | Canada | 277/216 |
| 151777 | 12/1984 | European Pat. Off. . | |
| 1193072 | 10/1959 | France | 277/215 |
| 0065210 | 5/1979 | Japan | 277/216 |
| 314865 | 6/1929 | United Kingdom | 277/215 |
| 0400106 | 10/1933 | United Kingdom | 277/216 |
| 423981 | 2/1935 | United Kingdom . | |
| 513932 | 10/1939 | United Kingdom | 277/215 |

Primary Examiner—Thomas B. Will
Assistant Examiner—James K. Folker
Attorney, Agent, or Firm—Baker & Botts

[57] ABSTRACT

For carrying out lubrication between a piston (17) and a piston ring (21) installed in an annular groove (23) of the piston, the piston ring comprises a recessed portion (15a, 15b) which is partially recessed from an upper axial end (27) of the piston ring. Lubricating oil is mixed with blow-by gas and flows into the annular groove through the recessed portion. As a result, the lubricating oil is effectively supplied to the annular groove. Therefore, the lubrication is favorably carried out between the piston ring and the piston. The piston ring may be formed from a piston ring member (10) of a ring-shaped plate which has the recessed portion on an outer peripheral surface (13) thereof.

22 Claims, 6 Drawing Sheets

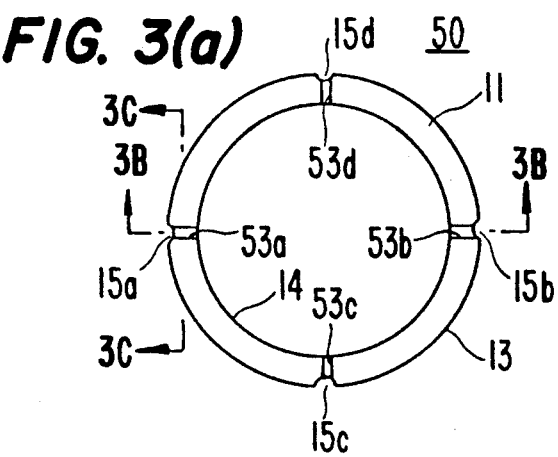
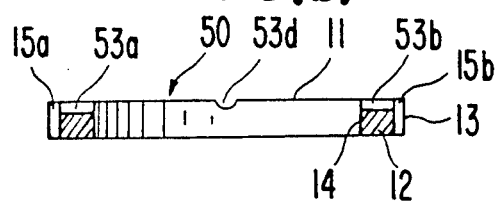
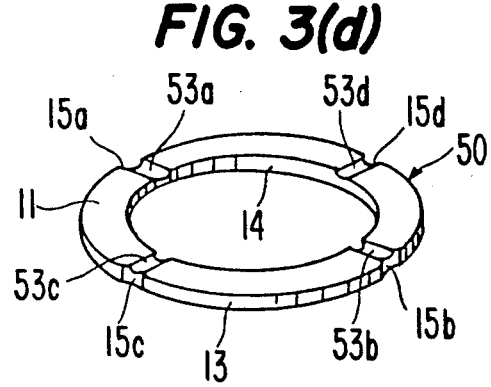
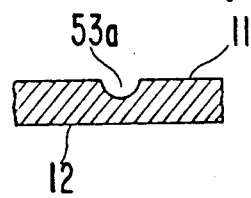
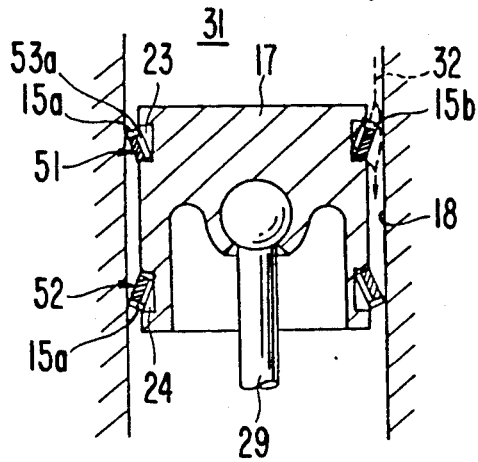
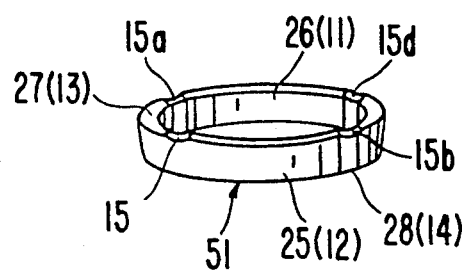

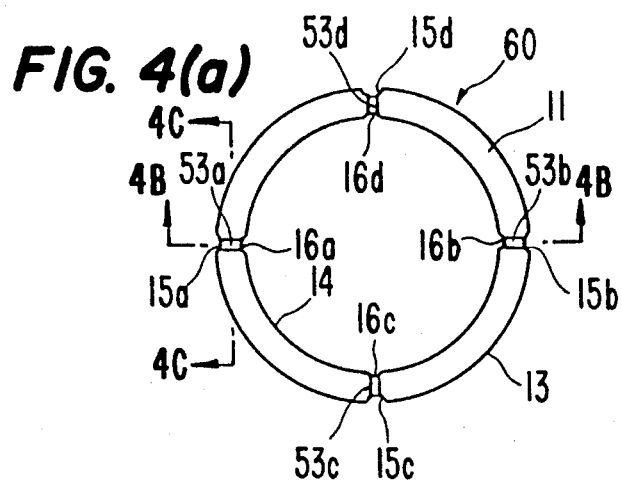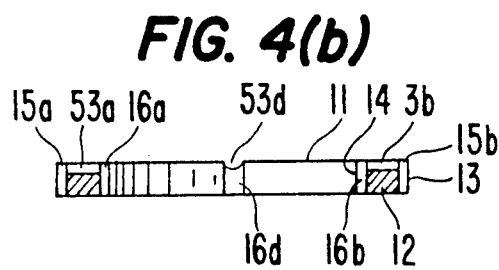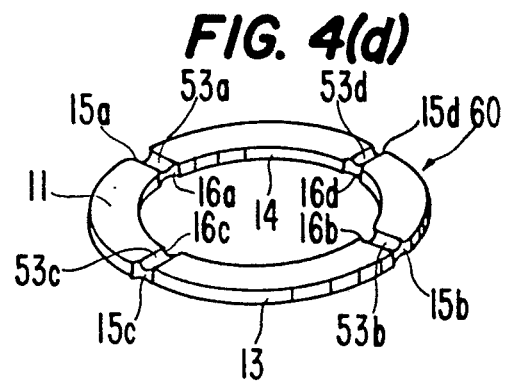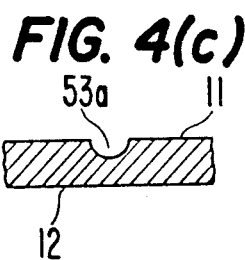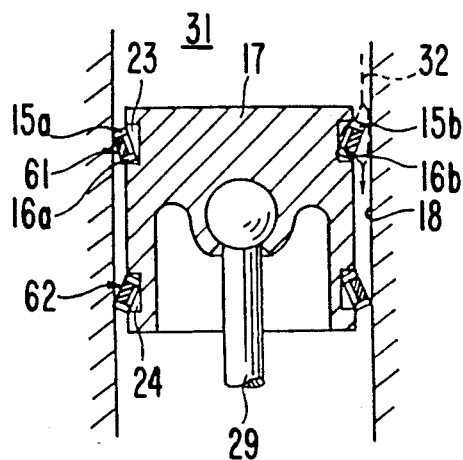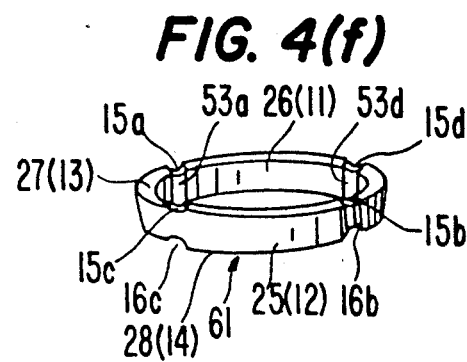

PISTON RING HAVING A FUNCTION WHICH IS FOR FACILITATING SUPPLY OF LUBRICATING OIL INTO AN ANNULAR GROOVE OF A PISTON

This application is a continuation of application Ser. No. 07/444,400, filed Dec. 1, 1989, now abandoned.

BACKGROUND OF THE INVENTION

This invention relates to a piston ring fitted on a piston reciprocating in a cylinder and, more particularly, to a piston ring which is suitable for use in a piston type compressor such as a slant plate type compressor.

In a compressor such as a slant plate type compressor, lubrication for the driving mechanism in the crank chamber is generally supplied by blow-by gas which is mixed with lubricating oil in a mist state. The crank chamber communicates with the suction chamber through a passageway. The blow-by gas returns to the suction chamber through the passageway to maintain certain pressure in the crank chamber.

As mentioned above, the blow-by gas is very important for operating the compressor. Therefore, amount of blow-by gas leaked into the crank chamber should be maintained at a constant level. Accordingly, a conventional piston ring is fitted in an annular groove which is made on an outer surface of each of the pistons.

For example, a piston ring as the conventional piston ring is disclosed in U.S. Pat. No. 4,835,856 (corresponding to J-P-A 63-13639) issued to Katsumasa Azami et al and assigned to SANDEN CORPORATION. The piston ring is provided with a plurality of communicating grooves in its outer peripheral surface ot communicate between the interior of the crank chamber and a compression space of each of the piston cylinders to insure the constant amount of blow-by gas. As a result, the lubrication oil smoothly flows from the compression space into the crank chamber through the communicating grooves of the piston ring with the piston reciprocating in each piston cylinder.

When the piston is reciprocated in each piston cylinder to carry out a compression, the piston ring is subjected to external force due to a differential pressure between the compression space and the crank chamber. Therefore, the piston ring is repeatedly moved in the annular groove of the piston in various directions. This results in abrasion of both of the piston and the piston ring. In order to reduce the abrasion, it is desirable to supply the lubricating oil into the annular groove.

SUMMARY OF THE INVENTION

It is therefore an object of the present invention to provide a piston ring having a function which is for reducing abrasion of both of a piston and the piston ring which is installed on the piston.

It is another object of this invention to provide a compressor of a piston type, wherein lubricating oil can effectively be supplied into an annular groove of the piston with the piston reciprocating in a piston cylinder.

It is still another object of this invention to provide a compressor of the type described, which is capable of carrying out lubrication between the piston and the piston ring by use of the lubricating oil which flows from a compression space towards a crank chamber.

According to an aspect of this invention, there is provided a piston ring member having a first flat surface, a second flat surface opposite to the first flat surface, an outer peripheral surface, and an inner peripheral surface concentric with the outer peripheral surface. The piston ring member comprises a recessed portion which is partially formed at the outer peripheral surface along the first flat surface.

According to another aspect of this invention, there is provided a piston ring having an outer and an inner cylindrical surface, and a first and a second axial end, the first axial end having a first diameter, the second axial end having a second diameter which is less than the first diameter. The piston ring comprises a recessed portion which is partially formed at the first axial end along the inner cylindrical surface.

BRIEF DESCRIPTION OF THE DRAWING

FIG. 3(a) is a plan view of a piston ring member according to a third embodiment of this invention;

FIG. 3(b) is a sectional view of the piston ring member taken along a line 3B—3B in FIG. 3(a);

FIG. 3(c) is a sectional view of the piston ring member taken along a line 3C—3C in FIG. 3(a);

FIG. 3(d) is a perspective view of the piston ring member illustrated in FIG. 3(a);

FIG. 3(e) is a sectional view of a part of a compressor comprising a cylinder and a piston which is inserted in the cylinder and which is provided with a piston ring formed from the piston ring member illustrated in FIG. 3(a);

FIG. 3(f) is a perspective view of the piston ring included in the compressor illustrated in FIG. 3(e);

FIG. 4(a) is a plan view of a piston ring member according to a fourth embodiment of this invention;

FIG. 4(b) is a sectional view of the piston ring member taken along a line 4B—4B in FIG. 4(a);

FIG. 4(c) is a sectional view of the piston ring member taken along a line 4C—4C in FIG. 4(a);

FIG. 4(d) is a perspective view of the piston ring member illustrated in FIG. 4(a);

FIG. 4(e) is a sectional view of a part of a compressor comprising a cylinder and a piston which is inserted in the cylinder and which is provided with a piston ring formed from the piston ring member illustrated in FIG. 4(a);

FIG. 4(f) is a perspective view of the piston ring included in the compressor illustrated in FIG. 4(e);

DESCRIPTION OF THE PREFERRED EMBODIMENT

Figure 1A:
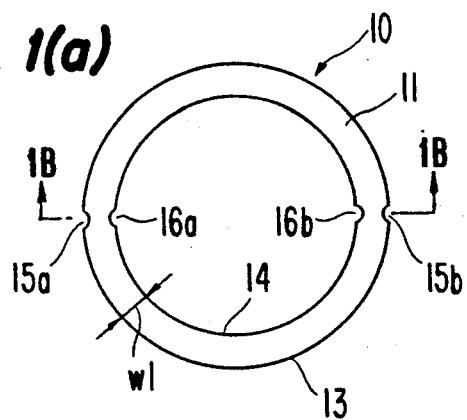
FIG. 1(a) is a plan view of a piston ring member according to a first embodiment of this invention.

Referring to FIGS. 1(a), (b), and (c), a piston ring member 10 according to a first embodiment of the present invention is for use in a compressor included in an air conditioning system which is useful in an automobile. The piston ring member 10 is a ring-shaped plate which is seamless. The piston ring member 10 has a first flat surface 11, a second flat surface 12, an outer peripheral surface 13, and an inner peripheral surface 14. The first flat surface 11 is opposite to the second flat surface 12. The outer peripheral surface 13 is concentric with the inner peripheral surface 14. The piston ring member 10 has a thickness ($t_1$) and a width ($w_1$) which will later be described in conjunction with the piston used in the compressor.

The piston ring member 10 comprises two outer recessed portions 15a and 15b which are formed at the outer peripheral surface 13 from the first flat surface 11 to the second flat surface 12. The outer recessed portions 15a and 15b have an angular space left therebetween. In the drawing, the outer recessed portions 15a and 15b are disposed on the piston ring member 10 at 180° intervals. One of the outer recessed portions 15a and 15b is referred to as an additional recessed portion. The outer recessed portions 15a and 15b will collectively be called a guiding arrangement which is for guiding lubricating oil.

The piston ring member 10 further comprises two inner recessed portions 16a and 16b which are recessed from the inner peripheral surface 14. The inner recessed portions 16a and 16b are opposite to the outer recessed portions 15a and 15b in a radial direction of the piston ring member 10, respectively.

Figure 1B:
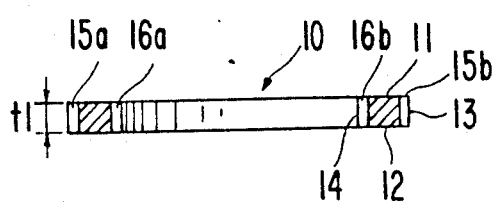
FIG. 1(b) is a sectional view of the piston ring member taken along a line 1B—1B in FIG. 1(a)
Figure 1C:
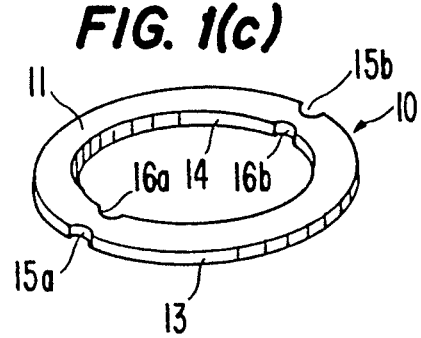
FIG. 1(c) is a perspective view of the piston ring member illustrated in FIG. 1(a)
Figure 1D:
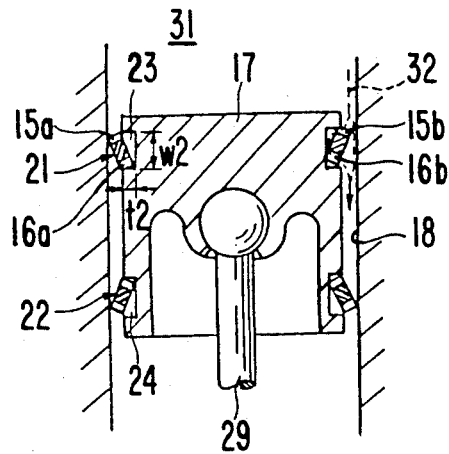
FIG. 1(d) is a sectional view of a part of a compressor comprising a cylinder and a piston which is inserted in the cylinder and which is provided with a piston ring formed from the piston ring member illustrated in FIG. 1(a)

Referring to FIGS. 1(d) and (e) in addition to FIGS. 1(a) through (c), the piston ring member 10 is assembled as each of first and second piston rings 21 and 22 on a piston 17 which is inserted into a cylinder 18 in the manner known in the art.

Figure 1E:
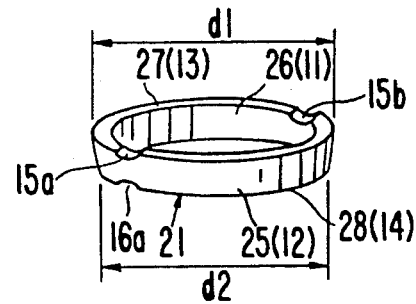
FIG. 1(e) is a perspective view of the piston ring included in the compressor illustrated in FIG. 1(d)

The piston 17 has an outer peripheral surface in which first and second annular grooves 23 and 24 are made. The first and the second piston rings 21 and 22 are fitted in the first and the second annular grooves 23 and 24, respectively. In this event, the piston ring member 10 is twisted to form each of the first and the second piston rings 21 and 22 so that the first flat surface 11 faces inwardly as depicted in FIG. 1(e). As a result, each of the first and the second piston rings 21 and 22 has an outer cylindrical surface 25, an inner cylindrical surface 26, a first axial end 27, and a second axial end 28. It is to be noted in this connection that the first axial end 27 has an outer diameter ($d_1$) which is greater than that ($d_2$) of the second axial end 28.

The first annular groove 23 has a width ($w_2$) which is substantially equal to the width ($w_1$) of the piston ring member 10. A depth ($t_2$) of the first annular groove 23 is less than the thickness ($t_1$) of the piston ring member 10. Therefore, the first piston ring 21 radially projects from the outer peripheral surface of the piston 17 to be in contact with the cylinder 18 when the first piston ring 21 is disposed in the first annular groove 23.

The second annular groove 24 has a size which is similar to that of the first annular groove 23. Therefore, the second piston ring 22 radially projects from the outer peripheral surface of the piston 17 when the second piston is disposed in the second annular groove 24.

Returning to FIG. 1(d), description will be made about operation of the compressor. When the piston 17 is reciprocated in the piston cylinder 18 by a piston rod 29, refrigerant gas is compressed in a compression space 31 in the manner known in the art. In this event, the refrigerant gas has a particular part which flows into a crank chamber (not shown) as blow-by gas. The blow-by gas is mixed with lubricating oil in a mist state. As a result, mixed gas is produced as well known in the art.

A flow of the mixed gas is depicted at a dashed line arrow 32 in FIG. 1(d). As will be clear from the drawing, a part of the mixed gas smoothly flows into the first annular groove 23 through each of the recessed portions 15a and 15b. As a result, the lubricating oil is supplied to the first annular groove 23. Therefore, lubrication is effectively carried out between the piston 17 and the first piston ring 21.

After the lubrication is carried out, the lubricating oil flows out from the first annular groove 23 through the inner recessed portions 16a and 16b and is sent to the crank chamber through the second piston ring 22. Each of the inner recessed portions 16a and 16b is referred to therein as a specific recessed portion. Another part of the mixed gas flows along the piston cylinder 18 and is sent to the crank chamber through the second piston ring 22.

Figure 2A:
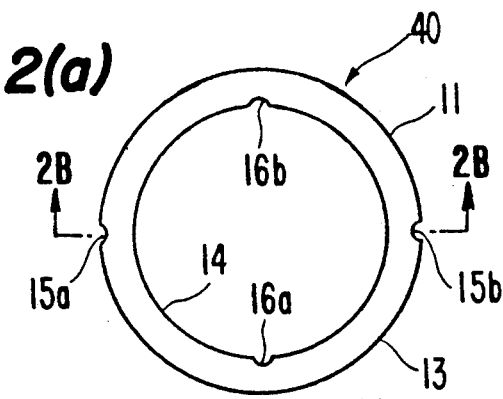
FIG. 2(a) is a plan view of a piston ring member according to a second embodiment of this invention.
Figure 2B:
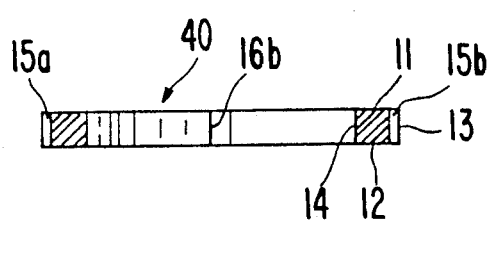
FIG. 2(b) is a sectional view of the piston ring member taken along a line 2B—2B in FIG. 2(a)
Figure 2C:
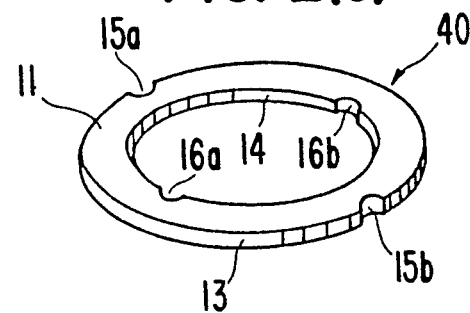
FIG. 2(c) is a perspective view of the piston ring member illustrated in FIG. 2(a)

Referring to FIGS. 2(a) through (c), description will be made about a piston ring member 40 according to a second embodiment of this invention. The piston ring member 40 comprises similar portions designated by the same reference numerals used in FIGS. 1(a)-1(e).

Figure 2D:
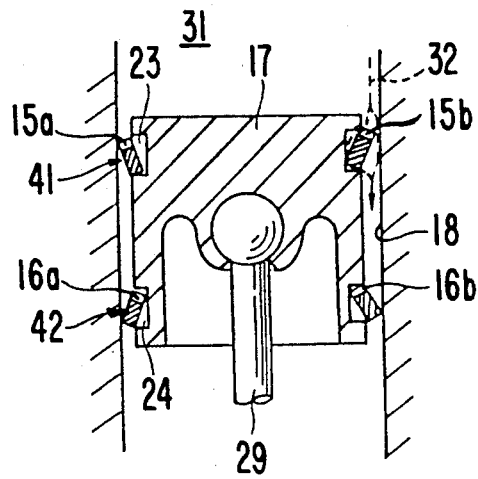
FIG. 2(d) is a sectional view of a part of a compressor comprising a cylinder and a piston which is inserted in the cylinder and which is provided with a piston ring formed from the piston ring member illustrated in FIG. 2(a)
Figure 2E:
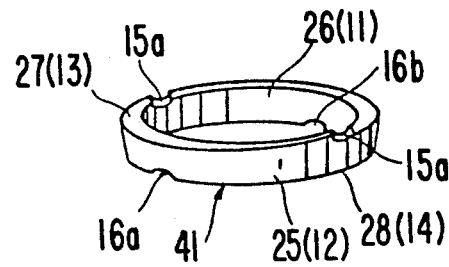
FIG. 2(e) is a perspective view of the piston ring included in the compressor illustrated in FIG. 2(d)

As will be clear from FIGS. 2(a) through (c), each of the inner recessed portions 16a and 16b is disposed at a position which has an angular offset of, for example, 90° against each of the outer recessed portions 15a and 15b. In FIGS. 2(d) and (e), the piston ring member 40 is installed as each of first and second piston rings 41 and 42 on the piston 17 in the manner described before.

With this structure, the lubricating oil flows into the first annular groove 23 through the outer recessed portions 15a and 15b and flows out through the inner recessed portions 16a and 16b after it is guided along the first annular groove 23 in a circular direction. Therefore, the lubricating oil is evenly or uniformly supplied to an entire area of the first annular groove 23.

Referring to FIGS. 3(a) through (c), description will be made about a piston ring member 50 according to a third embodiment of this invention. The piston ring member 50 comprises similar parts designated by the same reference numerals used in FIGS. 1(a)-1(e).

As will be clear from FIGS. 3(a) through (c), the piston ring member 50 further comprises additional outer recessed portions 15c and 15d which are partially recessed from the outer peripheral surface 13. Each of the additional outer recessed portions 15c and 15d is disposed at a position which has an angular offset of, for example, 90° against each of the first-mentioned outer recessed portions 15a and 15b.

In addition, the piston ring member 50 further comprises four groove portions 53a through 53d which are radially extended along the first flat surface 11 from the outer recessed portions 15a through 15d to the inner peripheral surface 14, respectivly. It is to be noted that the above-mentioned inner recessed portions is omitted in the piston ring member 50.

In FIGS. 3(d) and (e), the piston ring member 50 is installed as each of first and second piston rings 51 and 52 on the piston 17 in the manner described before. It is to be noted that the groove portions 53a through 53d are directed inwardly.

With this structure, the lubricating oil flows into the first annular groove 23 through the outer recessed portions 15a and 15b and is then guided by the groove portions 53a through 53d. After that, the lubricating oil flows out through a clearance which is between the first piston ring 51 and the piston 17.

The piston ring member 50 can be manufactured from a pipe-shaped member (not shown) of abrasion resistance material as described below. First, four grooves are made on an outer peripheral surface of the pipe-shaped member to extend parallel to a central axis of the pipe-shaped member. Those grooves are for producing the outer recessed portions 15a through 15d. Next, the pipe-shaped member is sliced perpendicular to the central axis to produce a ring plate. Lastly, the above-mentioned groove portions 53a through 53d are made in a selected one of axial end surfaces of the ring plate to thereby produce the piston ring member 50.

Referring to FIGS. 4(a) through (c), description will be made about a piston ring member 60 according to a fourth embodiment of this invention. The piston ring member 60 comprises similar portions designated by the same reference numerals used in FIGS. 3(a)-3(f).

As will be clear from FIGS. 4(a) through (c), the piston ring member 60 further comprises four inner recessed portions 16a, 16b, 16c, and 16d in addition to the outer recessed portions 15a through 15d and the groove portions 53a through 53d. The inner recessed portions 16a through 16d are partially formed at the inner peripheral surface 14 to be opposite to the outer recessed portions 15a and 15d, respectively.

In FIGS. 4(d) and (e), the piston ring member 60 is installed as each of first and second piston rings 61 and 62 on the piston 17 in the manner described before. It is to be noted that the groove portions 53a through 53d are directed inwardly.

With this structure, the lubricating oil smoothly passes through the outer recessed portions 15a and 15b with the lubrication between the piston 17 and the first piston ring 61.

Figure 5A:
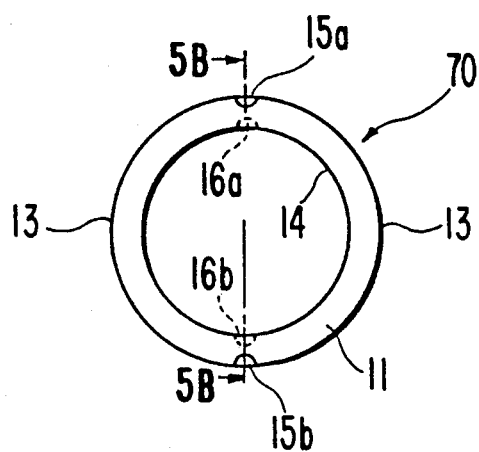
FIG. 5(a) is a plan view of a piston ring member according to a fifth embodiment of this invention.
Figure 5B:
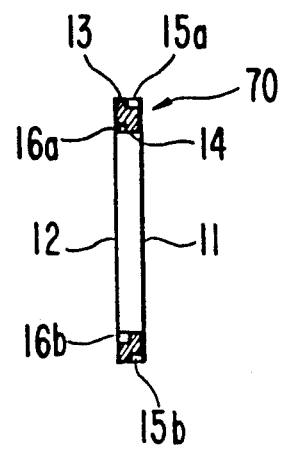
FIG. 5(b) is a sectional view of the piston ring member taken along a line 5B—5B in FIG. 5(a)
Figure 5C:
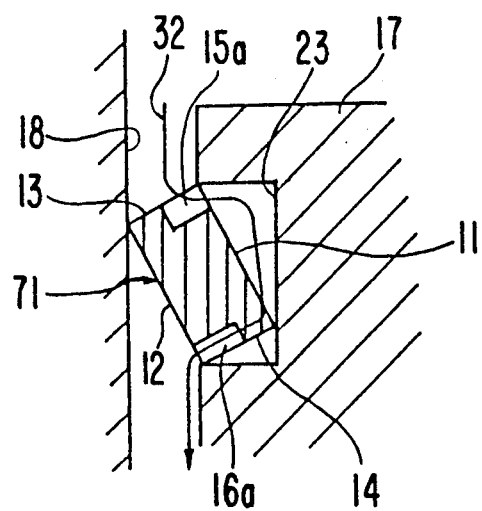
FIG. 5(c) is a sectional view of a part of a compressor comprising a cylinder and a piston which is inserted in the cylinder and which is provided with a piston ring formed from the piston ring member illustrated in FIG. 5(a)

Referring to FIGS. 5(a) through (c), description will be made about a piston ring member 70 according to a fifth embodiment of this invention. The piston ring member 70 comprises similar portions designated by the same reference numerals used in FIGS. 1(a)-1(e).

In FIGS. 5(a) through (c), each of the outer recessed portions 15a and 15b extends along the outer peripheral surface 13 from the first flat surface 11 to an intermediate position which is between the first and the second flat surfaces 11 and 12. In other words, each of the outer recessed portions 15a and 15b is partially formed at the outer peripheral surface 13 along the first flat surface 11. In such a manner, each of the outer recessed portions 15a and 15b may be made at a corner portion which is between the first flat and the outer peripheral surfaces 11 and 13.

On the other hand, each of the inner recessed portions 16a and 16b extends along the inner peripheral surface 14 from the second flat surface 12 to an intermediate portion which is between the first and the second flat surfaces 11 and 12. In such a manner, each of the inner recessed portions 16a and 16b may be made at a corner portion which is between the second flat and the inner peripheral surfaces 12 and 14.

Figure 6A:
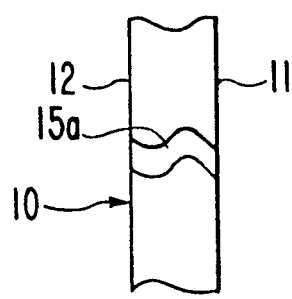
FIGS. 6(a), (b), (c), and (d) are side views of piston ring members according to modified embodiments of this invention, respectively.
Figure 6B:
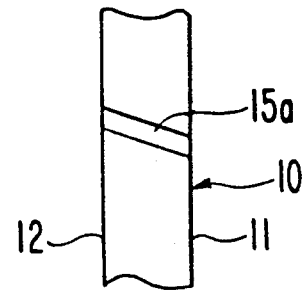

In each of the first through the fifth embodiments, the outer recessed portion 15a (or 15b) may be made to extend along a meander line as depicted in FIG. 6(a). As depicted in FIG. 6(b), the outer recessed portion 15a (or 15b) may be extended to intersect an imaginary plane which includes a central axis of the piston ring member 10.

Figure 6C:
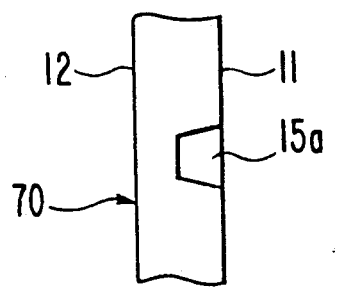
Figure 6D:
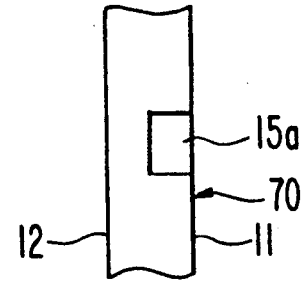

In addition, the outer recessed portion 15a (or 15b) may be rectangular in a side view of the piston ring member 70 as depicted in FIG. 6(d). As depicted in FIG. 6(c), the outer recessed portion 15a (or 15b) may be trapezoidal in a side view of the piston ring member 70.

While the present invention has thus far been described in connection with various embodiments thereof, it will readily be possible for those skilled in the art to put this invention into practice in various other manners. For example, the outer recessed portions may be more than four in number.

What is claimed is:

1. A piston ring assembly having a piston member, at least one annular groove in said piston member, a piston ring positioned in said annular groove so that a space extends along a portion of facing surfaces of said annular groove and said piston ring, wherein before being positioned in said annular groove said piston ring comprises a first flat surface, a second flat surface parallel to said first flat surface, an outer peripheral surface, and an inner peripheral surface parallel to and concentric with said outer peripheral surface, wherein the improvement comprises:

an outer recessed portion which is at least partially formed at said outer peripheral surface of said piston ring, an inner recessed portion which is at least partially formed at said inner peripheral surface of said piston ring, said recessed portions directing lubricant through said space between said annular groove and said piston ring, and an additional recessed portion formed at said outer peripheral surface, said additional recessed portion extending along said outer peripheral surface from said first flat surface to said second flat surface.

wherein said piston ring has a substantially rectangular cross section.

2. A piston ring assembly as claimed in claim 1, wherein said outer and inner recessed portions extend along said outer and inner peripheral surfaces, respectively, from said first flat surface to an intermediate position which is between said first and said second flat surfaces.

3. A piston ring assembly as claimed in claim 1, further comprising a groove portion extending along said first flat surface from said outer recessed portion to said inner recessed portion.

4. A piston ring assembly having a piston member, at least one annular groove in said piston member, a piston ring positioned in said annular groove so that a space extends along a portion of facing surfaces of said annular groove and said piston ring, wherein when positioned in said annular groove said piston ring comprises an outer and in inner cylindrical surface which are approximately parallel, and a first and a second axial end which are parallel, said first axial end having a first diameter, said second axial end having a second diameter which is less than said first diameter, wherein the improvement comprises:

a first recessed portion which is at least partially formed at said first axial end of said piston ring, a second recessed portion which is at least partially formed at said second axial end of said piston ring, said first and second recessed portions directing lubricant through said space between said annular groove and said piston ring, and an additional recessed portion which is at least partially formed at said first axial end along said first cylindrical surface, said additional recessed portion extending along said first axial end from said inner cylindrical surface to an intermediate position which is between said inner and said outer cylindrical surfaces.

5. A piston ring as claimed in claim 4, wherein said first and second recessed portions extend along said first and second axial ends, respectively, from said inner cylindrical surface to said outer cylindrical surface.

6. A piston ring as claimed in claim 4, wherein said additional recessed portion extends along said first axial end from said inner cylindrical surface to said outer cylindrical surface.

7. A piston assembly comprising:

a piston member having an outer annular surface and at least one groove formed in said outer annular surface, said groove being defined by a bottom surface and side surfaces; and a piston ring having a rectangular cross section before being positioned in said annular groove, wherein when positioned in said annular groove said piston ring comprising an outer cylindrical surface, an inner cylindrical surface approximately parallel to said outer cylindrical surface, a first axial end, and a second axial end parallel to said first axial end, said piston ring being positioned in said annular groove so that a space extends along a portion of facing surfaces of said inner cylindrical surface and said bottom surface of said annular groove, said piston ring having a recessed portion at least partially formed at said first axial end, said at least partially formed recessed portion extending along said first axial end from said inner cylindrical surface to an intermediate position which is between said inner and said outer cylindrical surfaces, said at least partially formed recessed portion directing lubricant through said space.

8. A piston assembly as claimed in claim 7, wherein said first axial end has a first diameter and said second axial end has a second diameter which is less than said first diameter.

9. A piston assembly as claimed in claim 8, wherein said first axial end extends beyond said side surfaces of said annular groove and said second axial end is disposed within said side surfaces of said annular groove.

10. A piston assembly as claimed in claim 7, wherein said at least partially formed recessed portion further extends along said first axial end from said inner cylindrical surface to said outer cylindrical surface.

11. A piston assembly as claimed in claim 10, wherein said recessed portion extends along a meander line between said outer and said inner cylindrical surfaces.

12. A piston assembly as claimed in claim 10, wherein said recessed portion extends at an angle between said inner and said outer cylindrical surfaces.

13. A piston assembly as claimed in claim 7, wherein said at least partially formed recessed portion has a trapezoidal form.

14. A piston assembly as claimed in claim 7, wherein said at least partially formed recessed portion has a rectangular form.

15. A piston assembly as claimed in claim 7, wherein said piston ring is formed with an additional recessed portion at least partially formed at said first axial end.

16. A piston assembly as claimed in claim 15, wherein said additional recessed portion extends along said first axial end from said inner cylindrical surface to said outer cylindrical surface.

17. A piston assembly as claimed in claim 15, wherein said additional recessed portion extends along said first axial end from said inner cylindrical surface to an intermediate position which is between said inner and said outer cylindrical surfaces.

18. A piston assembly as claimed in claim 7, wherein said piston ring is formed with an additional recessed portion at least partially formed at said second axial end.

19. A piston assembly as claimed in claim 7, wherein said piston ring is formed with a groove portion extending along said inner cylindrical surface from said recessed portion to said second axial end.

20. A piston ring assembly having a piston member, at least one annular groove in said piston member, a piston ring positioned in said annular groove so that a space extends along a portion of facing surfaces of said annular groove and said piston ring, wherein before being positioned in said annular groove said piston ring comprises a first flat surface, a second flat surface parallel to said first flat surface, an outer peripheral surface, and an inner peripheral surface parallel to and concentric with said outer peripheral surface, wherein the improvement comprises:

an outer recessed portion formed at said outer peripheral surface of said piston ring, and an inner recessed portion formed at said inner peripheral surface of said piston ring, said recessed portions directing lubricant through said space between said annular groove and said piston ring, said outer and inner recessed portions extending along said outer and inner peripheral surfaces, relatively, from said first flat surface to said second flat surface; and wherein said piston ring has a substantially rectangular cross section.

21. A piston ring assembly having a piston member, at least one annular groove in said piston member, a piston ring positioned in said annual groove so that a space extends along a portion of facing surfaces of said annular groove and said piston ring, wherein when positioned in said annular groove said piston ring comprises an outer and an inner cylindrical surface which are approximately parallel, and a first and a second axial end which are parallel, said first axial end having a first diameter, said second axial end having a second diameter which is less than said first diameter, wherein the improvement comprises:

a first recessed portion which is at least partially formed at said first axial end of said piston ring, and a second recessed portion which is at least partially formed at said second axial end of said piston ring, said first and second recessed portions extending along said first and second axial ends, respectively, from said inner cylindrical surface to an intermediate position which is between said inner and said outer cylindrical surfaces, said first and second recessed portions directing lubricant through said space between said annular groove and said piston ring, wherein said piston ring has a substantially rectangular cross section before being positioned in said annular groove.

22. A piston ring assembly having a piston member, at least one annular groove in said piston member, a piston ring positioned in said annular groove so that a space extends along a portion of facing surfaces of said annular groove and said piston ring, wherein when positioned in said annular groove said piston ring comprises an outer and an inner cylindrical surface which are approximately parallel, and a first and a second axial end which are parallel, said first axial end having a first diameter, said second axial end having a second diameter which is less than said first diameter, wherein the improvement comprises:

a first recessed portion which is at least partially formed at said first axial end of said piston ring, a second recessed portion which is at least partially formed at said second axial end of said piston ring, said first and second recessed portions directing lubricant through said space between said annular groove and said piston ring, and a groove portion extending along said inner cylindrical surface from said first recessed portion to said second recessed portion, wherein said piston ring has a substantially rectangular cross section before being positioned in said annular groove.

* * * * *